Jan. 13, 1959 W. C. BABCOCK 2,869,122
ANTENNA ARRAY
Filed Dec. 31, 1954
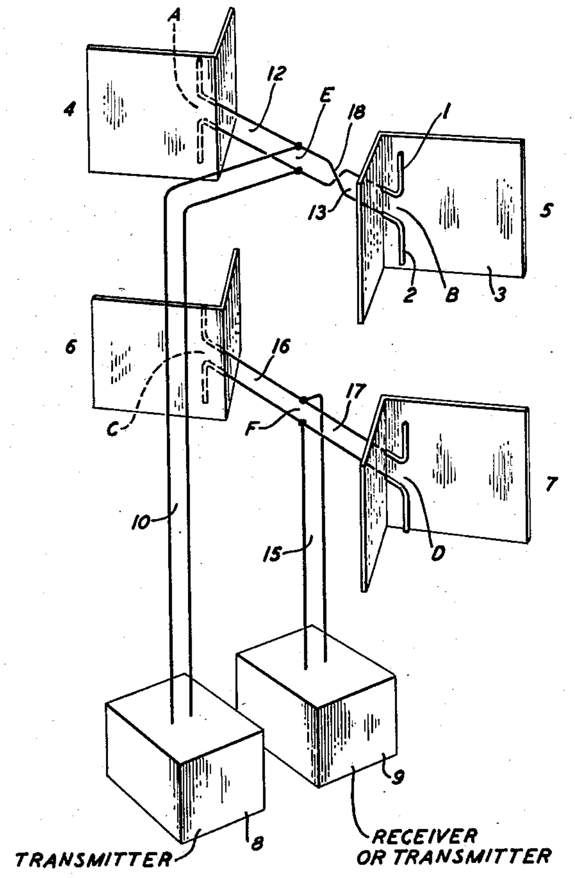
INVENTOR
W. C. BABCOCK
BY
Ralph T. Holcomb
ATTORNEY United States Patent Office 2,869,122

Patented Jan. 13, 1959

2,869,122

ANTENNA ARRAY

Wallace C. Babcock, Chatham, N. J., assignor to Bell Telephone Laboratories, Incorporated, New York, N. Y., a corporation of New York Application December 31, 1954, Serial No. 478,953

10 Claims. (Cl. 343—205)

This invention relates to radio systems and more particularly to directive antenna arrays.

The object of the invention is to reduce the coupling between an array of two differently directed, unidirectional transmitting antennas which are operating at one frequency and a similar, nearby array of two transmitting or receiving antennas which are also operating at a second, closely spaced, frequency.

In radio transmission systems such as are used for mobile service, the transmitting channel and the receiving channel must be closely spaced in frequency because of the limited frequency spectrum available. A base station for such a system operating along a highway ordinarily includes one or more pairs of oppositely directed, unidirectional, transmitting antennas and one or more pairs of oppositely directed, unidirectional, receiving antennas. It is advantageous to mount all of the antennas on a common mast or tower so that the most favorable site may be utilized and the transmitter and receiver located at the same point without introducing excessive transmission line losses. Heretofore, interference has been kept within tolerable limits by providing considerable space between adjacent arrays, resulting in an inefficient use of the mast, or by inserting expensive wave filters in the transmission leads.

In the arrangement in accordance with the present invention, the required spacing between two such transmitting arrays, or between a transmitting array and a receiving array, is greatly reduced without resorting to filters and without causing objectionable interference. The mutual coupling between the two halves of each array must be kept negligibly low. The antennas are so oriented that the mutual coupling between any two antennas in different arrays is substantially equal in magnitude to the mutual coupling between the remaining antennas and, in addition, the antennas in one array are connected in phase with each other but the antennas in the other array are connected 180 degrees out of phase with each other. Because of the low mutual coupling between the two halves of an array, the antennas may be operated out of phase with each other without appreciably changing the magnitude of the input impedance or introducing an undesired reactive component. Furthermore, the phasing of the two halves of an array has little or no effect on the ability of the array to transmit to or to receive from a mobile unit, since the mobile unit normally operates with only that half of the array which is directive toward it.

In the arrangement just described, if the two arrays are used for simultaneously transmitting different but closely spaced frequencies, any modulation products generated in one of the transmitters by signals from one antenna in the other array are cancelled out by modulation products due to the out-of-phase signals from the other antenna in the other array. Therefore, no unwanted, extraneous frequencies will be transmitted. In like manner, if one of the arrays is used for transmitting and the other array for receiving, any interfering signal picked up by the base-station receiver from one of the base-station transmitting antennas is cancelled out by a signal of equal magnitude but opposite phase from the other transmitting antenna.

A satisfactory arrangement is obtained if a line connecting the centers A and B of the antennas in one of the arrays and a line connecting the centers C and D of the antennas in the other array are horizontal, the lines AC and BD are of equal length, and the lines AD and BC also are equal in length. The proper phasing may be provided by connecting the transmitting antennas in one array to a transmitter through transmission paths in which the phase shifts are equal or differ by an integral multiple of 360 degrees at the operating frequency of this transmitter, and connecting the other two antennas to the other transmitter or to the receiver in like manner. The required phase reversal may be obtained by reversing the connections to one only of the four antennas.

The nature of the invention and its various objects, features, and advantages will appear more fully in the following detailed description of the typical embodiment illustrated in the accompanying drawing, the single figure of which is a perspective view of an arrangement comprising a pair of transmitting antennas and a second pair of antennas which may be used either for transmitting or for receiving.

The antennas may, for example, be located at a base-station in a mobile radio system. They may be supported by a common mast, tower, or other support, not shown. As shown, each antenna comprises a dipole constituted by a pair of elements 1 and 2 backed by a corner reflector 3 to provide a unidirectional radiation or reception pattern. It is to be understood that any other type of unidirectional antenna may be substituted. The dipole elements 1 and 2 are vertical and will radiate or pick up a vertically polarized signal. They may be differently oriented, if desired, for some other type of polarization, such as horizontal.

The two like transmitting antennas 4 and 5 are arranged back to back at the ends of a horizontal line connecting their centers A and B. Therefore, these antennas radiate energy in opposite directions, say east and west. Due to the unidirectional properties of the antennas, there will be negligible mutual coupling between them.

The other two antennas 6 and 7 are also alike and are arranged back to back at the ends of a horizontal line connecting their centers C and D, which are directly under the points A and B, respectively. These antennas, also, will have negligible mutual coupling.

Thus, the four centers A, B, C, and D are at the corners of an imaginary rectangle the sides AB and CD of which are horizontal and the sides AC and BD of which are vertical. However, it is not necessary that the figure ABCD be either rectangular or vertical, or even that the lines AB and CD be in the same plane. The only requirements are that the lines AB and CD be horizontal, that the lines AC and BD be equal, and that the lines AD and BC also be equal. For example, the point A may be moved to the left if the point B is moved the same distance to the right. Also, either of the arrays may be rotated around an imaginary, vertical, central axis EF through any desired angular displacement from its original position without causing objectionable interference between the two arrays. It is thus evident that the arrays 4–5 and 6–7 may operate in different azimuthal directions.

The radio transmitter 8 and receiver or second transmitter 9, shown as boxes, may be of conventional design. The transmitter 8 is connected to the transmitting antennas 4 and 5 in parallel by means of a transmission line 10 which branches at the point E into two paths 12 and 13. The phase shifts in the branches 12 and 13 are either equal or differ by an integral multiple of 360 degrees at the operating frequency $f_1$ of the transmitter 8. In like manner, the receiver or second transmitter 9 is connected to the antennas 6 and 7 in parallel by the transmission line 15 and branches 16, 17. The phase shifts in the branches 16 and 17 are equal or differ by an integral multiple of 360 degrees at the operating frequency $f_2$ of the device 9.

It is usually desirable to be able to operate the transmitter 8 and the receiver or second transmitter 9 at the same time without interference. Due to crowding of the available frequency band, the frequencies $f_1$ and $f_2$ generally must be closely spaced. If no special precautions are taken, when the devices 8 and 9 are both transmitters, intermodulation causes the generation and propagation of extraneous frequencies other than $f_1$ and $f_2$. When the device 9 is a receiver, the high-level signals radiated from the transmitting antennas 4 and 5 interfere with the comparatively weak incoming signals picked up by the receiving antennas 6 and 7. One remedy is to separate the two arrays a considerable distance. This greatly limits the number of arrays which may be mounted on the same mast. Alternatively, wave filters may be inserted in the transmission lines 10 and 15, but they are quite expensive.

In accordance with the present invention, the array 4–5 may be located quite close to the array 6–7 without requiring filters if the antennas are positioned as described above and if, in addition, the antennas in one of the arrays are connected in phase with each other while the antennas in the other array are connected 180 degrees out of phase with each other. As shown, the antennas 6 and 7 in the lower array are connected in phase. The transmitting antennas 4 and 5, however, are connected in phase opposition by crossing the branch line 13 at the point 18. Because the distance between the points A and C is equal to the distance between B and D, the mutual coupling between the antennas 4 and 6 is equal to the coupling between the antennas 5 and 7. Also, since the distances AD and BC are equal, the mutual coupling between the antennas 4 and 7 is equal to that between the antennas 5 and 6. Therefore, any transmitted energy of frequency $f_1$ picked up by the antennas 6 and 7 from the transmitting antenna 4 will be balanced out by a component of equal magnitude but opposite phase picked up from the other transmitting antenna 5. Consequently, none of the transmitted signals of frequency $f_1$ will appear at the receiver or second transmitter 9 to cause interference or modulation. In like manner, if the device 9 is a transmitter, any signals of frequency $f_2$ will be cancelled out before they reach the transmitter 8 and cause undesired modulation. It will be apparent that, alternatively, the antennas 4 and 5 may be connected in phase and the antennas 6 and 7 out of phase.

It will be understood that the above-described arrangement is merely illustrative of the application of the principles of the invention. Numerous other arrangements may be devised by those skilled in the art without departing from the spirit and scope of the invention.

What is claimed is:

1. In combination, two horizontal antenna arrays located close together and adapted to operate simultaneously at closely spaced frequencies, each of said arrays including two similar unidirectional antennas with negligibly low mutual coupling positioned for operation in different directions, a radio transmitter connected to each of said antennas in one of said arrays, and a radio device connected to each of said antennas in the other of said arrays, the spacing between one antenna in one of said arrays and one antenna in the other of said arrays being approximately equal to the spacing between the other antennas, the spacing between the one antenna in one array and the other antenna in the other array being approximately equal to the spacing between the remaining antennas, the antennas in one of said arrays being connected in phase with each other, and the antennas in the other of said arrays being connected 180 degrees out of phase with each other.

2. The combination in accordance with claim 1 in which said radio device is a second transmitter.

3. The combination in accordance with claim 1 in which said radio device is a receiver.

4. The combination in accordance with claim 1 in which said directions are opposite.

5. The combination in accordance with claim 1 in which each of said antennas comprises a dipole and a corner reflector.

6. The combination in accordance with claim 1 in which the centers of all of said antennas lie in the same plane.

7. The combination in accordance with claim 6 in which lines successively connecting said centers form a rectangle.

8. The combination in accordance with claim 7 in which said rectangle is vertical.

9. In combination, two horizontal antenna arrays located close together and adapted to operate simultaneously at closely spaced frequencies, each of said arrays including two similar unidirectional antennas with negligibly low mutual coupling positioned for operation in different direction, a radio transmitter connected to each of said antennas in one of said arrays, and a radio device connected to each of said antennas in the other of said arrays, said arrays being so positioned with respect to each other that the mutual coupling between any two antennas in different arrays is substantially equal in magnitude to the mutual coupling between the remaining antennas, the antennas in one of said arrays being connected in phase with each other, the antennas in the other of said arrays being connected 180 degrees out of phase with each other, said transmitter being connected in parallel to its associated antennas through transmission paths which differ from each other in phase shift by an integral multiple, including zero, of 360 degrees at its operating frequency, said radio device being connected in parallel to its associated antennas through transmission paths which differ from each other in phase by an integral multiple, including zero, of 360 degrees at its operating frequency, and the connection to one of said antennas being reversed with respect to the connection to the antenna associated therewith in the same array.

10. In a radio system, in combination, two antenna arrays, a transmitter, a transmission line connecting the transmitter to one of the arrays, a second radio translating device, and a second transmission line connecting the device to the other array, the arrays being located close together and operating at closely spaced frequencies, each of the arrays comprising two unidirectional antennas connected back to back on a horizontal line, the distance between one antenna in one array and one antenna in the other array being approximately equal to the distance between the other antennas, the distance between the one antenna in the one array and the other antenna in the other array being approximately equal to the distance between the remaining antennas, and the connections to one of the antennas being reversed with respect to the connections to the other antenna in the same array.

References Cited in the file of this patent

UNITED STATES PATENTS

| | | |
|---|---|---|
| 716,136 | Stone | Dec. 16, 1902 |
| 2,290,692 | Lindenblad | July 21, 1942 |